Feb. 21, 1933.　　　　　A. DINA　　　　　1,898,173
APERTURE PLATE FOR POWER'S PROJECTION MACHINES
Filed July 25, 1929　　　3 Sheets-Sheet 1

INVENTOR
Augusto Dina
BY
Howard W. Dix
ATTORNEY

Feb. 21, 1933.   A. DINA   1,898,173
APERTURE PLATE FOR POWER'S PROJECTION MACHINES
Filed July 25, 1929   3 Sheets-Sheet 2

INVENTOR
Augusto Dina
BY
Howard W. Dix
ATTORNEY

Feb. 21, 1933.   A. DINA   1,898,173
APERTURE PLATE FOR POWER'S PROJECTION MACHINES
Filed July 25, 1929   3 Sheets-Sheet 3
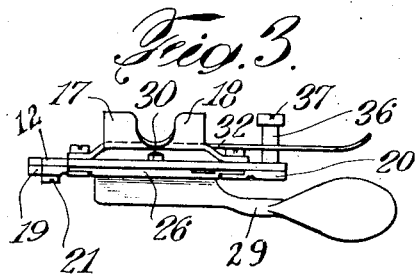
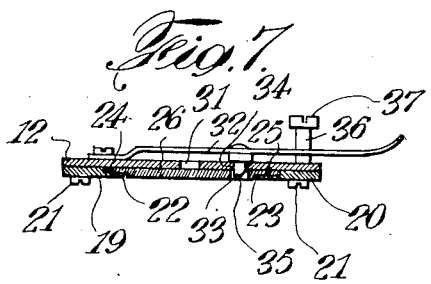
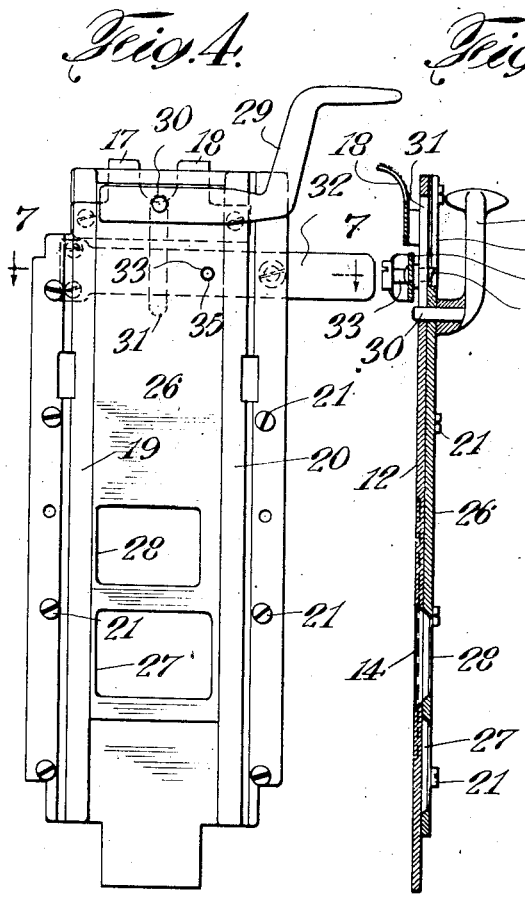
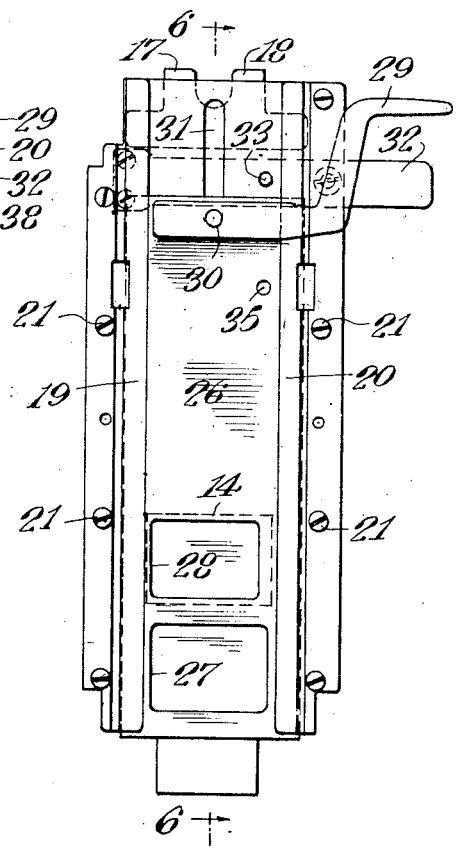
INVENTOR
Augusto Dina
BY
ATTORNEY Patented Feb. 21, 1933

1,898,173

UNITED STATES PATENT OFFICE

AUGUSTO DINA, OF JERSEY CITY, NEW JERSEY, ASSIGNOR TO INTERNATIONAL PROJECTOR CORPORATION, OF NEW YORK, N. Y., A CORPORATION OF DELAWARE

APERTURE PLATE FOR POWER'S PROJECTION MACHINES

Application filed July 25, 1929. Serial No. 380,833.

This invention relates to motion picture apparatus and particularly to the projectors therefor, and has especial reference to new and improved aperture plates for the type of projector known as the Powers and similar projectors.

A main object of the invention is to provide a simple, compact, efficient, and durable aperture plate which may be very easily and quickly substituted for the usual ones employed on projectors of the above mentioned types, and which will permit these types of projectors to be used to project not only standard film but also the films having the sound striata along one edge for the simultaneous production of sound in movie-tone projection.

A further object is to provide an aperture plate which, after being installed, may be quickly manipulated to change the aperture opening to one or the other type depending upon which type of film is to be projected.

A still further object is to provide a substitute aperture plate which does not require the slightest alteration or modification of the usual machine of the Powers type.

Further and more specific objects, features, and advantages will more clearly appear from the detailed description given below when taken in connection with the accompanying drawings which form part of the specification and which illustrate one embodiment of the invention.

The invention, when contemplated in general terms, comprises a flat plate of the same size of the usual aperture plate employed in projectors of the Powers type and which can be readily substituted for the usual one without the slightest alteration or modification of the usual parts of the machine and without any alteration of the operation of the associated mechanism. It is merely a question of taking one off and putting the other one in its place. This improved movie-tone aperture plate has the usual standard size opening therein and is also provided with a slide plate which contains at least two openings, one conforming in size to the standard aperture size and the other being altered in size to conform to the size of the picture section on the movie-tone film which generally is shortened as to the width thereof along one side which is usually occupied by the sound striata.

This slide plate, containing the plurality of apertures therein, has a normal lowermost position in which it generally rests by its own weight and in which position the modified aperture therein is exposed in registry with the main aperture opening in the main plate to which the slide plate is operatively attached. When it is desired to adapt the machine for the projection of normal pictures, the slide is raised and this brings the normal sized opening in registry with the main opening in the aperture plate. This raising of the slide is effected by any suitable means such as a simple hand grip as illustrated in Figs. 2 to 7 inclusive and which projects from the edge of the slide member preferably at the top thereof. When the slide reaches the top of its modified position it is engaged by a suitable holding means such as a latch mechanism which locks it in the raised position so that the modified aperture is held firmly in place. When it is desired to change back to the movie-tone film operation, a projection from the latch mechanism is ready to the hand of the operator and can be manipulated quickly to permit the slide plate to be moved to its lower position. This whole operation from one position to another is accomplished by a flick of the fingers and that will take place in a second even while the film is running.

In the present preferred form of the invention shown in the drawings,

Fig. 3 is a plan view of the modified plate;

Fig. 4 is a front elevation of the same;

Fig. 5 is a similar view showing the slide plate in position to project movie-tone pictures;

Fig. 6 is a section taken on the line 6—6 of Fig. 5;

Fig. 7 is a section taken on the line 7—7 of Fig. 4; and,

Figure 2:
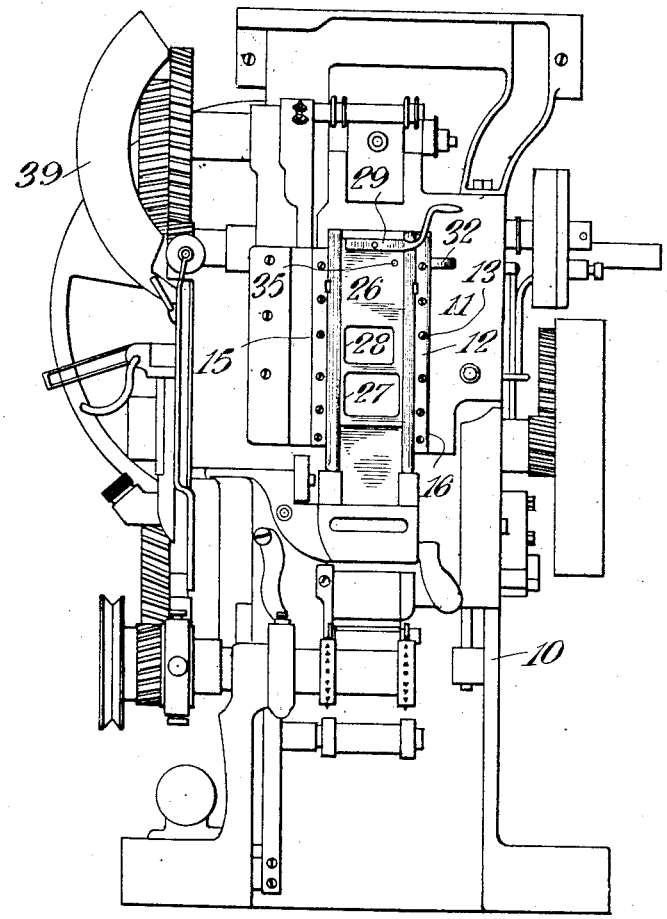
Fig. 2 is a front elevation of the projection head looking at the face of the partition supporting the aperture plate, with the associated gate swung away to expose the same and showing the modified aperture plate in position.

As shown in the drawings, the invention is adapted to be used on a machine of the Powers type which comprises a projection head 10 provided with a transverse partition 11 having an aperture in relation to which there is fastened an aperture plate 12 by any suitable means such as screws 13. This aperture plate 12 has an aperture 14 therein which is of standard size for the projection of standard films. This plate 12 sets into a suitable shallow groove on the face of the partition 11 which is indicated in Fig. 2 by the lines 15 and 16. By merely removing the few screws which hold the plate 12 in this recess, the operator can grip the fingers 17 and 18 at the top of the plate 12 with his hand and pull it up and out of the recess. These fingers 17 and 18 are fastened to the back of the plate 12 at the top thereof.

At the front of the plate 12 along the sides thereof and extending vertically of the plate 12 are a pair of flange plates 19 and 20 (see Fig. 7) which are fastened to the face of the aperture plate 12 by suitable means such as screws 21. The inner adjacent edges of these flange plates 19 and 20 are spaced from the face of the aperture plate 12 as shown at 22 and 23 to form slots or grooves, which may be dovetailed or tapered to conform to the lateral edges of the slide plate such edges being indicated by the numerals 24 and 25 and the slide plate by the numeral 26 associated with the front face of the aperture plate 12, the main body portion of the slide plate 26 being of a thickness to bring its front face flush with the front faces of the flange plates 19 and 20 so as to permit and present a smooth exterior surface against which the film can travel across the aperture opening.

The slide plate 26 is provided with two apertures therein, one 27 is of the standard size for the projection of standard pictures and the other 28 is of less width by being reduced along one lateral edge to be used with movie-tone films which have striata along that edge. The apertures 27 and 28 are disposed one above the other with the modified aperture 28 preferably above the other.

The slide plate 26 may be moved up and down by any suitable means which may join the plate at a satisfactory position. There is fastened to the top of the slide plate a satisfactory operating member such as a handle 29 which projects laterally so as to permit ready contact with the hand of the operator when it is desired to shift the slide plate 26. This handle is preferably attached to the front of the slide plate 26. At the top of the slide plate 26 there is also provided a rearwardly projecting pin 30 which extends through a slot 31 in the aperture plate 12 near the top thereof. This engagement limits the vertical movement of the slide plate 26. To the back of the aperture plate 12 there is pivoted a spring member 32, the outer end of which projects laterally beyond the side of the aperture plate 12 and adjacent the end of the handle 29 so as to permit the hand of the operator to readily manipulate it. This spring or latch member 32 carries a latch pin 33 which projects through a hole 34 in aperture plate 12 and into a hole 35 in the slide plate when the slide plate 26 is in its uppermost position wherein it is projecting normal or standard size pictures. A stop screw 36 has a head 37 with which the spring 32 engages in its outward movement to limit the outward movement of the spring 32.

In the operation of the device, it is assumed that the machine is equipped with the ordinary aperture plate. To change over to the plate shown in this application, it is only necessary to remove the screws holding the standard plate in position in the recess on the partition 11, then the improved aperture plate 12 according to this invention can be slid into the recess from above and fastened in place by the screws such as 13 above mentioned. This will take only a moment or two and does not entail any changes or alterations in the construction of the machine or its parts. Then the slide plate 26 is adjusted in its upper or lower position depending upon whether the projection is of a standard film or a movie-tone film. If it is moved to its upper position, it is apparent that it will be latched in this position by means of the latch pin 33 and that in its lower position it will maintain its position by gravity and that in this lower position the modified opening 28 will be registered with the aperture 14 above mentioned in the plate 12. It will be noted that the pin 33 has its lower face bevelled as at 38 to permit of the upward movement thereon of the inner face of the slide plate 26, whereby it acts as a latch member. Observing the slide plate 26 in its upper position shown in Fig. 4, it will be apparent that when the right hand of the operator approaches the plate 26 that the thumb of the hand will lie nearest the end of the spring 32 and the first finger of the hand will lie nearest the handle 29. Instinctively the thumb will press inward on the spring 32 and the finger will press down on the handle and move the slide plate 26 to its lower position quicker than it would be thought possible.

Figure 1:
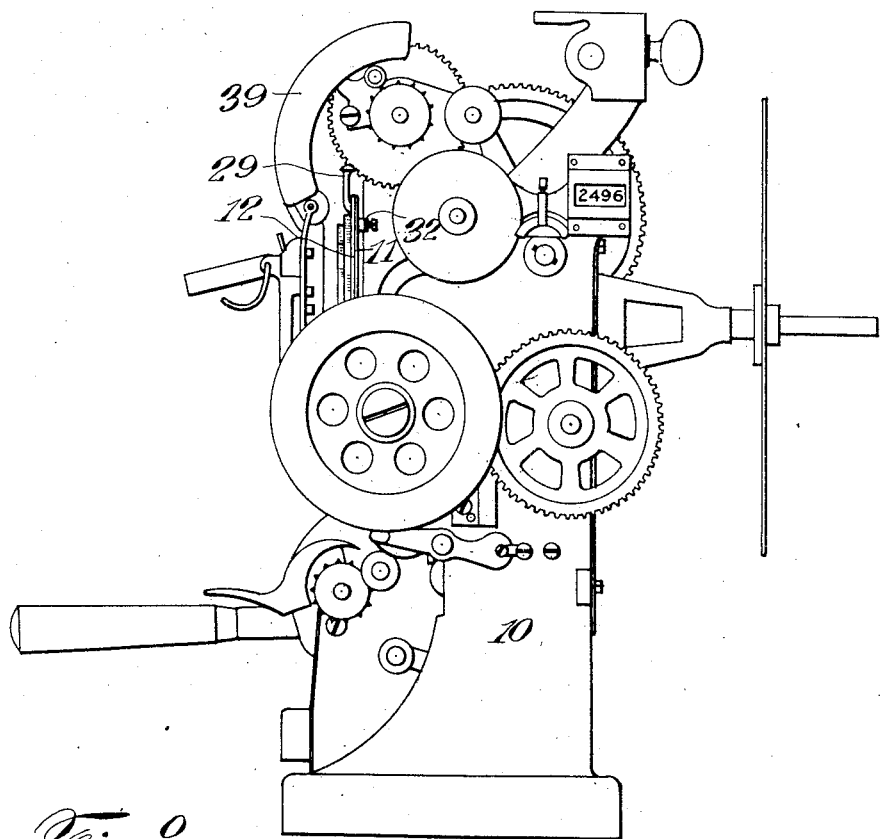
Fig. 1 is a side elevation of a machine of the Powers type with particular reference to the projection head thereof.

Therefore the only thing on the front face of the improved aperture plate which breaks the even smooth surface is the handle 29 and it, as seen in Fig. 1, is above the point where the film begins to contact with the plate 12 since the loop in the film is couched in the guide 39 and then slopes inward toward the aperture plate 12 at a point below the handle 29, whether it is in its lower or upper position.

Figure 8:
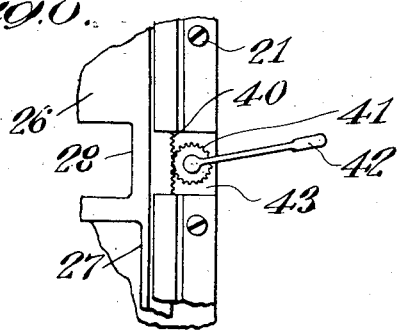
Fig. 8 is a partial view of a modified form of slide operating mechanism.

In Fig. 8 the slide plate 26 has one edge provided with a rack having teeth 40 engageable with similar teeth 41 on an operating handle 42 pivoted on the side of the aperture plate 12 preferably in a notch 43 in one of the flanges such as 20. When the handle 42 is operated the slide plate is moved up and down quickly and positively.

While the improved aperture plate has been described as particularly adaptable to the Powers projector it is to be understood that it is not limited to use only with such machines since the same idea may be adapted to other machines without such alterations in the construction and arrangement of parts as would constitute a separate invention from that shown herein. Therefore while the invention has been described in detail and with respect to a preferred form thereof, it is not desired that it be limited to such details or forms since many changes and modifications may be made and the invention embodied in other forms without departing from the spirit and scope of the invention in its broader aspects. Hence it is desired to cover all forms and modifications coming within the language or scope of any one or more of the appended claims.

What is claimed, is,

1. In a projector for motion pictures, a head, a partition thereon along which the film travels, an aperture plate thereon, said plate disposed in a recess in said partition, means for fastening the plate in the recess, a slide plate movably mounted on the aperture plate, and having a plurality of apertures thereon to be selectively registered with the aperture in the aperture plate, manual means for moving the slide plate to register one of its apertures, and means for latching it in this position.

2. In a projector for motion pictures, a head, a partition thereon along which the film travels, an aperture plate thereon, said plate disposed in a recess in said partition, means for fastening the plate in said recess, a slide plate mounted movably on the aperture plate, and having a plurality of apertures thereon to be selectively registered with the aperture in the aperture plate, manual means for moving the slide plate to register one of its apertures, means for automatically latching it in this position, and manual means for releasing said latching means to permit the slide plate to be moved to another position.

3. In a projector for motion pictures, an aperture plate having an aperture therein of standard size, a slide plate mounted on the aperture plate and having a standard and a modified opening therein and spaced apart from each other, a handle on the slide plate projecting laterally of the aperture plate to be grasped by the operator to move the slide plate to register one or the other opening with the normal opening in the aperture plate, a spring pressed latch member on the aperture plate, said slide plate having an opening therein to receive said latch member when moved to a predetermined position, and manual means connected to said latch member to release it when the slide plate is to be moved from said position.

4. In a projector for motion pictures, an aperture plate having an aperture therein of standard size, a slide plate mounted on the aperture plate and having a standard and a modified opening therein spaced apart from each other, a handle on the slide plate projecting laterally of the aperture plate to be grasped by the operator to move the slide plate to register one or the other opening with the normal opening in the aperture plate, a spring pressed latch member on the aperture plate, said slide plate having an opening therein to receive said latch member when moved to a predetermined position, manual means connected to said latch means to release it when the slide plate is to be moved from said position, and a pin on the slide plate and adapted to slide in a slot in the aperture plate to limit the vertical movement of the slide plate on the aperture plate.

5. In a projector for motion pictures, an aperture plate, a partition on the projection head of the projector having a recess in which the aperture plate is seated with its face flush with the face of the partition, spaced flanges on the face of the aperture and grooved, a slide plate on the face of the aperture plate, the edges of the slide plate received in said grooves, the main portion of the slide plate being flush with the face of the flanges, said slide plate having spaced apertures to be registered selectively with the aperture in the aperture plate, a laterally projecting handle on the slide plate to be grasped by the operator to move the slide plate to one or another position, a spring pressed latch member on the aperture plate, and adapted to engage in an opening in the slide plate when moved to a predetermined position, manual means for releasing the latch member, and means for limiting the vertical movement of the slide plate with respect to the aperture plate.

6. In a projector for motion pictures, an aperture plate, a slide plate movable thereon, a handle at the top of the slide plate to be engaged by a finger of the operator, a spring latch member on the aperture plate and extending laterally just below the handle to be engaged by the thumb of the operator, to facilitate the release of the slideable plate.

7. In a projector for motion pictures, an aperture plate, a slide plate movable thereon, a handle at the top of the side plate to be engaged by the finger of the operator, a spring latch member on the aperture plate and extending laterally just below the handle to be engaged by the thumb of the operator to facilitate the release of the slideable plate, and means on the latch member to automatically engage the slide plate in one of its positions to latch it therein.

AUGUSTO DINA.